United States Patent [19]
Khan et al.

[11] Patent Number: 5,965,976
[45] Date of Patent: Oct. 12, 1999

[54] GAS DISCHARGE LAMPS FABRICATED BY MICROMACHINED TRANSPARENT SUBSTRATES

[75] Inventors: Babar Ali Khan, Ossining; David A. Cammack, Scarborough; Ronald D. Pinker, Peekskill; Jerry Kramer, Yorktown Heights; Vivek Mehrotra, Rye Brook, all of N.Y.

[73] Assignee: Philips Electronics North America Corp., New York, N.Y.

[21] Appl. No.: 08/994,875

[22] Filed: Dec. 19, 1997

Related U.S. Application Data

[63] Continuation-in-part of application No. 08/484,256, Oct. 27, 1994, Pat. No. 5,796,209, and a continuation of application No. 07/922,707, Jul. 28, 1992, abandoned.

[51] Int. Cl.$^6$ ........................................ H01J 61/33
[52] U.S. Cl. ........................... 313/493; 313/634; 445/44
[58] Field of Search ........................... 313/634, 493, 313/582, 610, 616, 632, 574, 491, 584, 573, 110, 111, 113, 114; 445/44

[56] References Cited

U.S. PATENT DOCUMENTS

| | | | |
|---|---|---|---|
| 4,990,826 | 2/1991 | Cocks et al. | 313/485 |
| 5,438,343 | 8/1995 | Khan et al. | 313/493 |

*Primary Examiner*—Sandra O'Shea
*Assistant Examiner*—Joseph Williams
*Attorney, Agent, or Firm*—F. Brice Faller

[57] ABSTRACT

A high pressure gas discharge lamp and the method of making same utilizing integrated circuit fabrication techniques. The lamp is manufactured from heat and pressure resistant planar substrates in which cavities are etched, by integrated circuit manufacturing techniques, so as to provide a cavity forming the gas discharge tube. Electrodes are deposited in the cavity. The cavity is filled with gas discharge materials such as mercury vapor, sodium vapor or metal halide. The substrates are bonded together and channels may be etched in the substrate so as to provide a means for connection to the electrodes. Lamps having ignition enhancing and hot restrike features, as well as single-sided electrodes, are disclosed.

8 Claims, 7 Drawing Sheets

| LAMP | VOLTAGE VOLTS | CURRENT mA | POWER WATTS | LUMENS | LUMENS/WATT | Lm/mm | Lm/mmWATT |
|---|---|---|---|---|---|---|---|
| SINGLE-SIDED 1.2 mm ARC | 25 | 486 | 12.2 | 227 | 19 | 190 | 15.6 |
| | 35 | 650 | 23 | 900 | 40 | 750 | 32.6 |
| 80atm, 2 WAFER 3.6 mm ARC | 58.9 | 397 | 23 | 740 | 32 | 211 | 9.2 |
| | 158 | 546 | 86.5 | 5300 | 61 | 1500 | 17.3 |
| 147atm, 5 WAFER 3.1 mm ARC | 51.4 | 431 | 22.2 | 620 | 28 | 200 | 9.0 |
| | 95.1 | 581 | 55.3 | 2890 | 52 | 932 | 16.9 |

DOUBLE SIDED (bracket covering last four rows)

FIG. 9a

GAS DISCHARGE LAMPS FABRICATED BY MICROMACHINED TRANSPARENT SUBSTRATES

This application is a continuation-in-part of Ser. No. 08/484,256 filed Oct. 27, 1994 now U.S. Pat. No. 5,796,209 and a continuation of Ser. No. 07/922,707 filed Jul. 28, 1992, abandoned.

This invention was made with the United States Government support under Cooperative Agreement No. 10NANB441510 awarded by the National Institute for Standards and Technology (NIST). The United States Government has certain rights in the invention.

BACKGROUND AND SUMMARY OF THE INVENTION

This invention is directed to high or low pressure gas discharge lamps used for lighting and display.

Gas discharge lamps (mercury vapor, sodium vapor, metal halide) are an important segment of the lighting industry. It is well known that the luminous efficiency of gas discharge bulbs increases substantially at high pressures (1–200 atmospheres). However, the containment of such high pressures in a transparent vessel has presented significant problems. Gas pressure is restricted in many instances because of the difficulty of finding materials that are sufficiently lightweight, while at the same time capable of withstanding high temperatures and pressures. Furthermore, such materials, to be practical, must be capable of relatively inexpensive mass production. The usual construction of gas discharge lamps is to suspend a transparent pressure and heat resistant discharge tube by means of a metal framework within an outer glass bulb. The conventional discharge tube is made by glass blowing techniques in a continuous flow method, i.e., a process in which one lamp is constructed at a time.

The present invention relies on an entirely new paradigm for the construction of high pressure gas discharge lamps. Rather than a discharge tube made by glass blowing using techniques that allow only one lamp to be manufactured at a time, the present invention relies on methods of fabricating high pressure "microlamps" utilizing micromachining techniques which are similar to integrated circuit fabrication techniques such as the etching and bonding of planar substrates. This allows many lamps to be fabricated at once, for example, by batch processing in a wafer. It also allows each lamp to be constructed in exactly the same manner, which allows all lamps to have similar properties and minimizes variations between lamps. The present invention incorporates an improved gas discharge lamp that can withstand very high pressures and the method of making such a lamp by means of integrated circuit manufacturing techniques.

It is a further objective of this invention to make extremely small lamps with features which cannot be achieved by traditional glass blowing methods in a reproducible and cost-effective manner. These features include microlamps with electrodes placed on one end, microlamps with hot-restrike capabilities and microlamps with an integrated device, which makes lamp ignition easier.

The lamp is manufactured from two or more planar sheets of temperature and pressure resistant transparent material. A cavity is etched in one or both of the sheets and electrodes are deposited in the cavity. The cavity is charged with a filler appropriate to the type of lamp being manufactured such as mercury, xenon, argon, sodium or metal halides, or some combination thereof. The sheets are then bonded together so as to seal the cavity within the sheets. Contact may then be made with the electrodes to activate the lamp, by creating an arc within the cavity.

The present invention incorporates a built-in ultraviolet ignition enhancer or starter. A separate "enhancer" cavity may be fabricated in the substrate sheets in close proximity to the lamp cavity. The enhancer cavity may be charged with an appropriate gas, and electrically coupled to the electrodes of the lamp cavity. During ignition, the gas in the enhancer cavity emits ultraviolet light, increasing the photoemission of electrons from the electrode material or the inside wall in the main lamp, thus facilitating the ignition of an arc in the main lamp.

The present invention also provides a hot re-strike capability in the lamp. In particular, two lamps comprised of adjacent cavities in the substrate may be connected to the starting ballast in parallel. An initial starting voltage will create an arc in one of the lamps. Because of the low thermal conductivity of the substrate, the adjacent lamp remains relatively cool. If the arc in the first lamp is extinguished, the adjacent lamp will start immediately upon re-strike. Further, because of the small dimensions of these "microlamps", the source of light looks similar at a distance.

The present invention further provides a method of making single-ended microlamps in which the electrodes are placed on one side of the cavity created within the sheets, rather than on diametrically opposite sides. This configuration allows a reduction in size, improved optical applications by removing shadowing effects present in double-ended lamps, improved start-up and heat dissipation, precise control of the arc gap, and allowing lower wattage high intensity discharge lamps by lowering the thermal mass of the lamp.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENT

Figure 1:
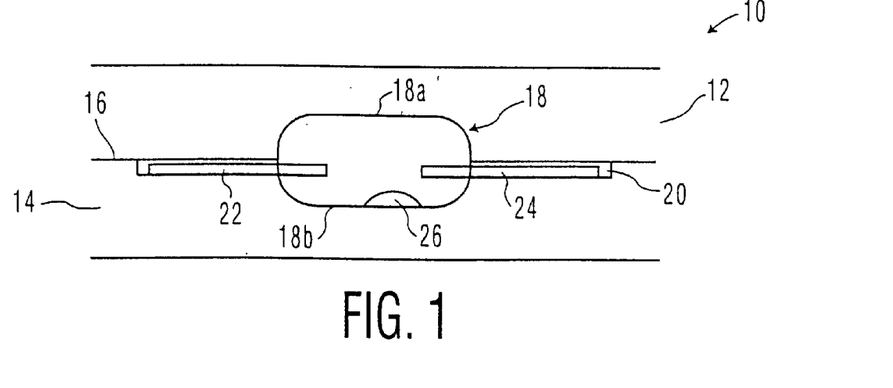
FIG. 1 is a sectional view of a lamp manufactured in accordance with the present invention.
Figure 2:
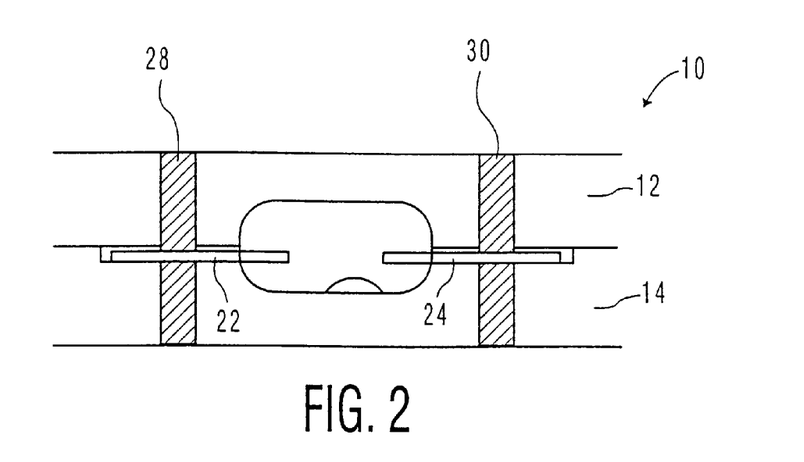
FIG. 2 is a sectional view of the lamp of FIG. 1 after further manufacture in accordance with the present invention.
Figure 3:
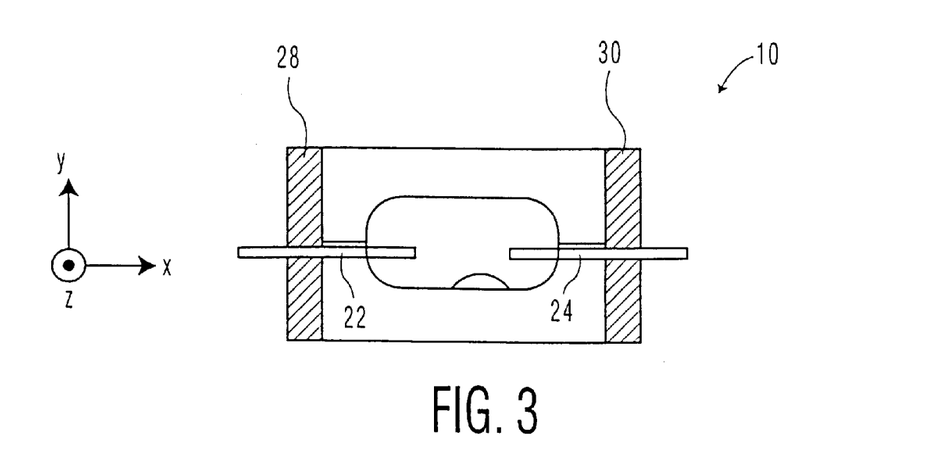
FIG. 3 is a sectional view of the lamp of FIG. 1 after further manufacture in accordance with the present invention.

FIGS. 1–3 illustrate a high pressure lamps fabricated in accordance with the present invention. As shown in the figures, a lamp 10 is fabricated from a first planar substrate 12 and a second planar substrate 14 which are bonded together by suitable means, as described below, and each lamp 10 comprises a cavity 18 thus forming an individual luminescent micro-lamp. In FIGS. 1–3, the cavities 18 are depicted as generally oval and the substrates 12 and 14 are depicted as planar. It should be kept in mind that the cavities and substrates may be of any size and shape.

FIG. 1 illustrates a lamp constructed in accordance with the present invention, before the final processing steps shown in FIGS. 2 and 3. The steps of manufacturing the lamp will also be discerned from the figures. Planar substrate 14 is transparent and consists of material suitable for containing the pressure and temperature of an operating lamp, one such suitable material is quartz. Cavity 18 which comprises half-cavities 18a, 18b in each of the substrates 12, 14, respectively, is formed by integrated circuit manufacturing techniques.

The lower surface of un-etched upper substrate 12 is covered by suitable masking material, such as polysilicon, at the portions where etching is not desired, as etching will occur at the unmasked portions. Thereafter, the masked substrate is exposed to an etchant such as hydrofluoric acid for a time suitable to create the upper half-cavity 18a portion of cavity 18. The time and amount of exposure to the etchant may be adjusted, in the known manner, to provide the cavity size and shape desired.

Lower substrate 14 is first masked and etched so as to form a relatively wide rectangular cavity 20. A second deeper central half-cavity 18b is then etched into substrate 14 by suitable masking and etching techniques.

Electrodes 22, 24 are positioned on in rectangular cavity 20 of lower substrate 14 and partially overhang half-cavity 18b. The electrodes are solid filaments of suitable electrode material, such as tungsten, and solid. (Alternatively, the electrode material may be deposited on rectangular cavity 20 before half-cavity 18b is etched, by using known masking, depositing and etching techniques. Half cavity 18b may then be etched using an etchant which does not attack the material of electrodes 22, 24.)

After the formation of half-cavities 18a and 18b in substrates 12 and 14, respectively, the composite cavity 18 is charged with a suitable luminescent material. In this embodiment, the lamp is a mercury lamp so that an appropriate sized drop of mercury 26 is placed in cavity 18. If cavity 18 is to be charged with a gas such as Argon, the bonding of substrates 12, 14 may take place in an argon atmosphere at a pressure suitable for the final lamp. Accordingly, substrates 12 and 14 are placed in a pressure vessel at the appropriate argon pressure for the lamp to be manufactured. Thereafter, lower surface of substrate 12 is bonded to upper surface of substrate 14.

The bonding interface 16 between the substrates 12, 14 may be formed by any suitable means such as heat, chemical or anodic bonding. ("Bonding", for the purposes of this invention, includes interaction at a molecular level between the two substrates, such that the interface between the substrates becomes indistinguishable.) After the bonding is completed, the completed lamp 10 is removed from the pressure vessel and cavity 18 will contain an argon atmosphere having a charge of mercury that will vaporize and form a mercury vapor lamp upon energization.

For certain bonding processes, it is desirable that the surfaces of substrates 12, 14 that are to be bonded together be planarized. This can be accomplished by depositing phosphorus doped silicon dioxide and polishing the surface. Alternatively a smooth surface can be obtained by depositing phosphorous doped silicon dioxide and reflowing (heating) it. This can also be done by using known chemical mechanical polishing (CMP) processes.

FIGS. 2 and 3 illustrate final processing of the lamp 10 of FIG. 1. Melt and cut zones 22, 24 are used to further seal the electrodes 22, 24 within the substrate. (The "melt and cut zones" will be referred to simply as "melt zones" hereinafter.) Melt zones 28, 30 are formed by exposing the completed lamp to a $CO_2$ laser which will melt the quartz substrates to seal the tungsten electrodes firmly therewithin. Additionally, a layer of molybdenum may be added to the tungsten electrodes to aid in sealing. The molybdenum layer will assist the substrate/electrode seal with or without melt zones 28, 30.

FIG. 3 shows the final individual lamp 10, separated from the rest of the substrate by cutting away the substrate 12, 14 outside the melt zones 28, 30. The portion of the electrodes 22, 24 that extend through the seal of the melt zones 28, 30 provide external contacts for voltage and ballast connections.

As noted above, lamps fabricated by this methodology may be any type of gas discharge lamp. The material suitable for the substrates is also not required to be quartz as any transparent material, such as sapphire or aluminum oxide, capable of withstanding the heat and pressure may be used. In certain circumstances, glass is a suitable substrate for use with the certain types of lamps. The number of cavities disposed in the substrate may be varied in accordance with the requirements of the application. The lamps may be used as illumination or as display. Finally, the lamps can be energized all at once or circuitry can be disposed on the substrate so as to provide non-simultaneous activation of the various microlamps disclosed in the substrate.

As also noted above, a lamp such as that shown in FIG. 3 may be constructed so that it is completely compatible with integrated circuit processing techniques. When the rectangular cavity 20 is etched in substrate 14, tungsten electrodes 22, 24 may be deposited on the surface of the cavity 20 using masking and vapor deposition techniques. The deposited electrodes 22, 24 are then masked before lower half-cavity 18b is etched. Sealing the lamps with melt zones 28, 30 proceeds as before, but a molybdenum is not necessary to add to the electrodes to aid the seal.

Typical dimensions of the lamp of FIGS. 1–3 are a cavity 18 of 5×2×2 mm (dimensions in x, y, and z, respectively, as shown in the figures). The substrates 12, 14 typically have a thickness (y dimension) of 2.5 mm and width of 10 mm (x dimension) and 30 mm (y dimension). Electrodes 22, 24 are typically 1 mm in length, inside cavity 18.

Figure 4:
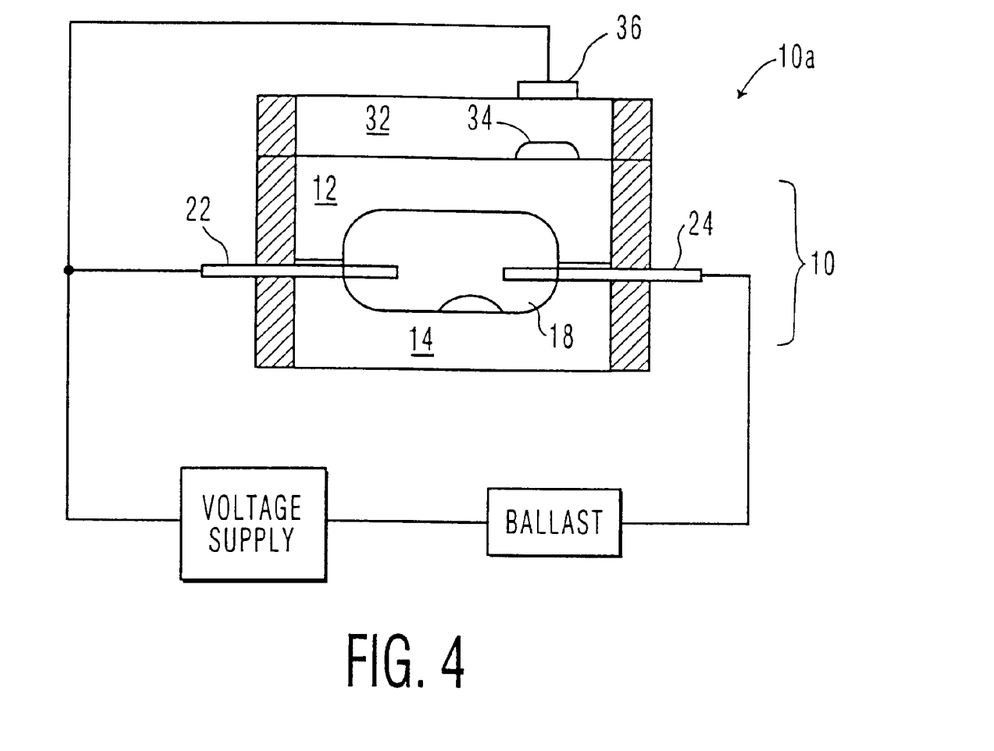
FIG. 4 is a lamp of the present invention having an ignition enhancer feature.

FIG. 4 illustrates a lamp 10a constructed in accordance with the present invention having an ignition enhancer. The lamp 10a builds upon the lamp 10 shown in FIG. 3 above, and common features are given the same numeric labels in FIG. 4.

As shown in FIG. 4, in constructing lamp 10a, a third substrate sheet 32 is prepared and bonded with the top portion of upper substrate 12. The third substrate 32 is prepared by masking and etching an enhancer cavity 34 therein. The enhancer cavity 34 is charged with a source of ultraviolet light, such as a mercury/argon combination or xenon, and the cavity 34 is sealed by bonding substrate 12 and substrate 32 together.

Figure 4A:
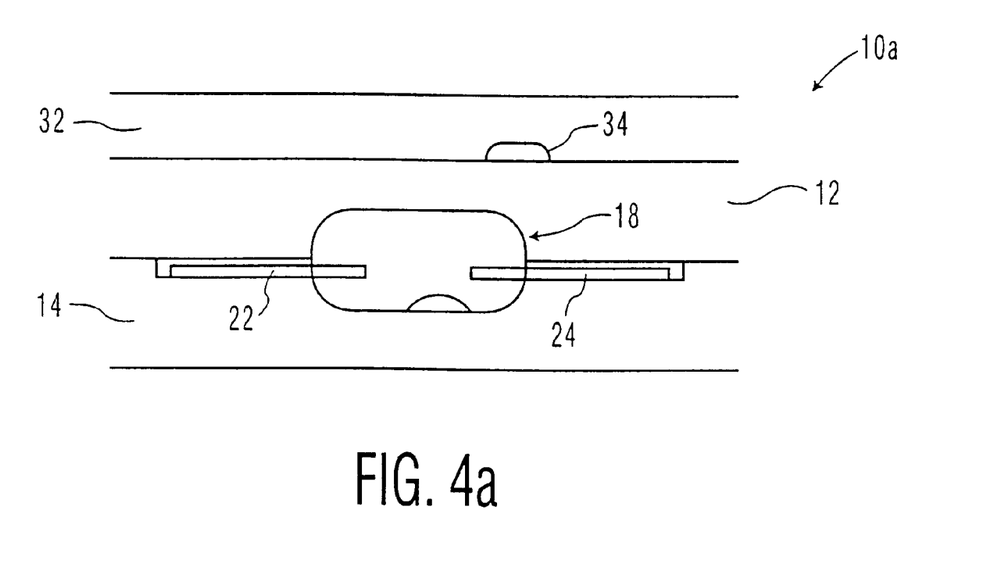
FIG. 4a is a lamp as in FIG. 4 at an earlier stage of production.

In practice, the steps for constructing lamp 10a is integrated with the steps for constructing lamp 10 of FIGS. 1–3. For example, FIG. 4a shows lamp 10a in a similar state of construction as lamp 10 of FIG. 1. Thus, in addition to the construction of portion of lamp 10 described above with respect to FIG. 1, third sheet substrate 32 has been etched with cavity 34, and position on top of substrate 12. The cavities 18 and 34 are charged as described above, and the interface between substrates 12, 14 may be bonded at the same time as the interface between substrates 12, 32. Final processing, by creating melt zones and cutting the substrates to have exposed portions of the electrodes 22, 24, analogous to the description above for FIGS. 2 and 3, giving those features of the lamp 10a as depicted in FIG. 4.

Referring back to FIG. 4, an electrode 36 is deposited on top of substrate 32 adjacent enhancer cavity 34. Electrodes 22, 36 are connected to one end of a voltage supply/ballast combination, and electrode 24 is connected to the other. During start-up, capacitive coupling between electrode 24 and electrode 36 will create a discharge in the enhancer cavity 34, which emits ultraviolet radiation. The ultraviolet emissions will create photoemission of electrons at both electrodes and the lamp wall. For example, in an ac field where electrode 24 is the cathode, there will be photoemission from the cathode electrode 24, the lamp wall and, to a lesser degree, from electrode 22, thus facilitating creation of the arc in cavity 18.

Figure 5:
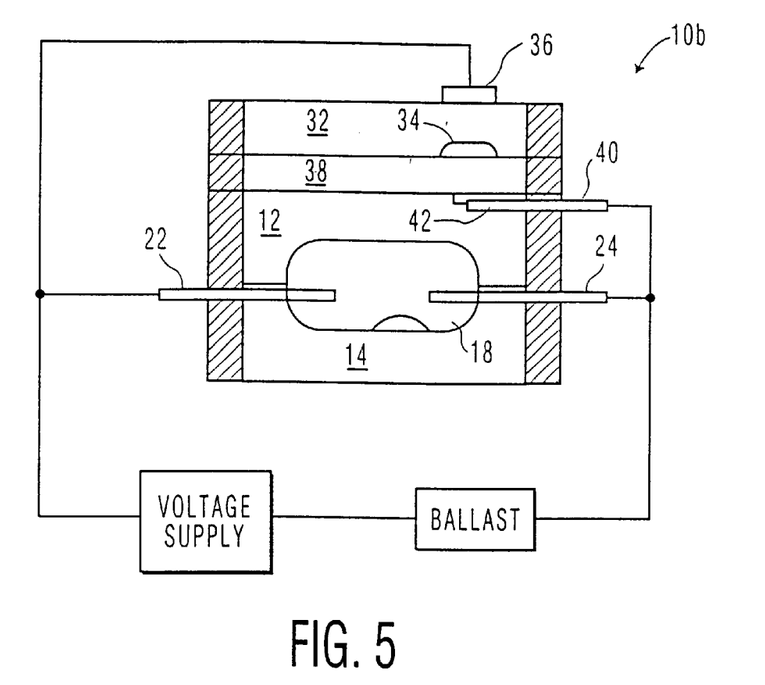
FIG. 5 is an alternative embodiment of a lamp of the present invention having an ignition enhancer feature.

FIG. 5 shows an alternative embodiment of the lamp having an ignition enhancer. The lamp 10b of FIG. 5 is structurally similar to the lamps in the prior figures, except a fourth electrode 40 is positioned in a channel 42 etched in substrate 12 and a fourth substrate 38 is interposed between substrate 12 and substrate 32. (Other common features of the lamp 10b of FIG. 5 are given the same reference numbers as in FIG. 4.) As shown, electrode 40 is connected to the same side of the voltage supply/ballast as electrode 24, and is thus capacitively coupled with electrode 36 above the enhancer cavity 34. The fourth electrode 40 may be positioned closer to the enhancer cavity 34, thus enhancing breakdown in the cavity 34.

Figure 6:
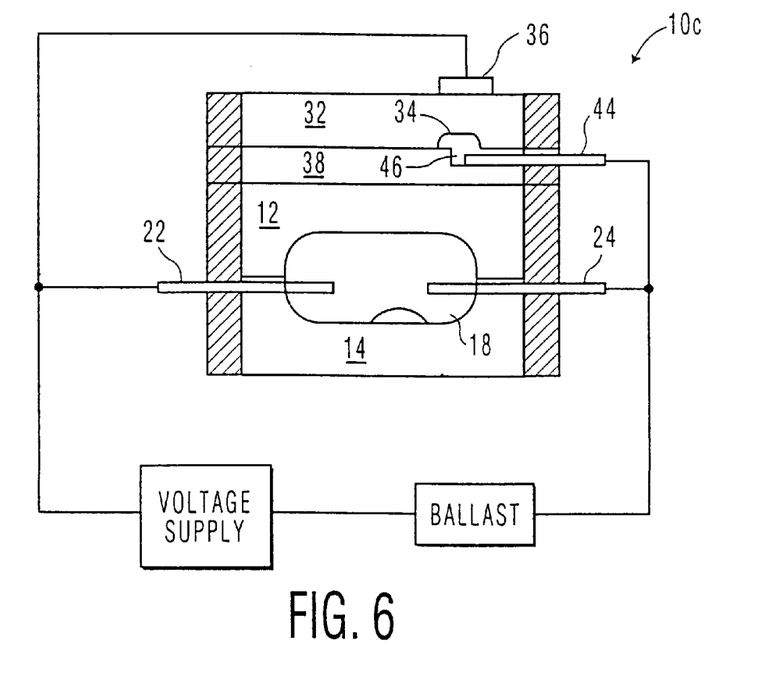
FIG. 6 is an alternative embodiment of a lamp of the present invention having an ignition enhancer feature.

FIG. 6 is an alternative embodiment of the lamp of FIG. 5. A fourth electrode 44 of lamp 10c is positioned in a channel 46 etched at the top of fourth substrate 38, adjacent the bottom of upper-most substrate 32 and enhancer cavity 34 therein. As shown, a portion of electrode 46 is exposed within the enhancer cavity 34. Electrode 44 is again connected to the same side of the voltage supply/ballast as electrode 24, and is thus capacitively coupled with electrode 36 above the enhancer cavity 34. By positioning a portion of the fourth electrode 44 within the enhancer cavity 34, the capacitive coupling is improved, thus providing greater probability of breakdown and emission of ultraviolet radiation from cavity 34.

While the enhancer fill can be mercury and argon, it is advantageous to use a purely gaseous fill so that the enhancer will operate even when the lamp is hot. This would allow the enhancer to provide a hot re-strike capability. In addition to pure xenon, the fill can be a combination of argon, chlorine and xenon. Other combinations of gases are possible. Additionally, where the electrodes providing the capacitive coupling around the enhancer cavity are not exposed to the enhancer cavity, as in FIGS. 4 and 5 above, the fill may be a gas that would otherwise corrode the electrodes, such as chlorine.

The enhancer cavity described above with respect to FIGS. 4–6 would typically have dimensions of 0.5×2×1 mm (although it may have a somewhat rounded shape after etching). The thickness of the interposed substrate (38) would be on the order of 0.5 to 0.25 mm, but may be even thinner. The position of the enhancer cavity is close to the discharge cavity (18), but the position within substrate 32 may be varied to account for the areas of "wall blackening" that will arise in discharge cavity 18. Once such areas are identified for a particularly shaped discharge cavity 18, the position of the enhancer cavity 34 may be adjusted so that most photons emitted from the enhancer cavity 34 will be incident on non-blackened surfaces of the discharge cavity 18.

Figure 7:
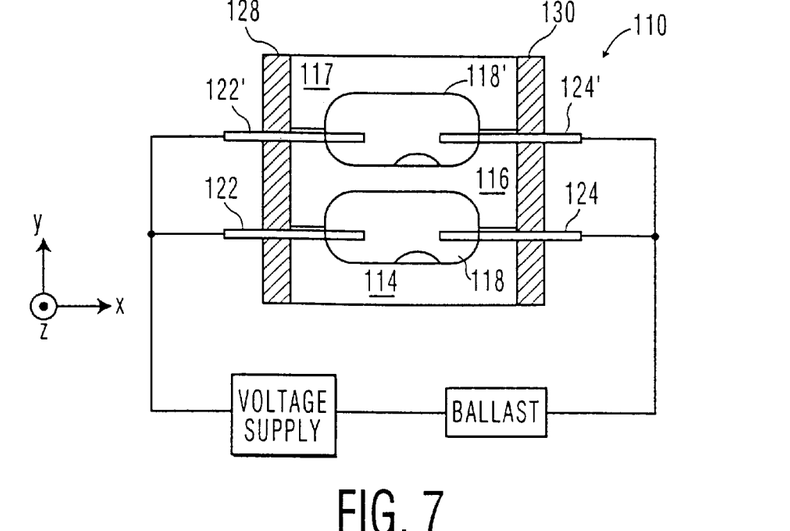
FIG. 7 is a lamp of the present invention having a hot restrike feature.

A hot re-strike capability is also provided by the lamp 110 of FIG. 7. The lamp of FIG. 7 is constructed in a manner analogous to FIGS. 1–3, except that an additional substrate layer 117 is used to create a second cavity 118' above and adjacent to the first cavity 118.

As is known in the art, only one of the two cavities 118 or 118' of FIG. 7 will arc upon ignition. Presuming, for example, cavity 118 arcs first, then cavity 118' will not arc. Because of the relatively low thermal conductivity of the substrate material and small heat transfer between cavities 118, 118', cavity 118' will remain at a lower temperature, and a sufficient amount of mercury will remain condensed such that immediate ignition is possible. Thus, if cavity 118 is extinguished, application of an ignition voltage will cause cavity 118' to immediately arc.

In order for the adjacent cavity to remain sufficiently cool, there should be on the order of 2–10 mm of quartz substrate interposed between cavities 118, 118'. When used in a typical manner, with illumination distances on the order of yards or meters, illumination by one or the other cavity will not be distinguishable.

Figure 8:
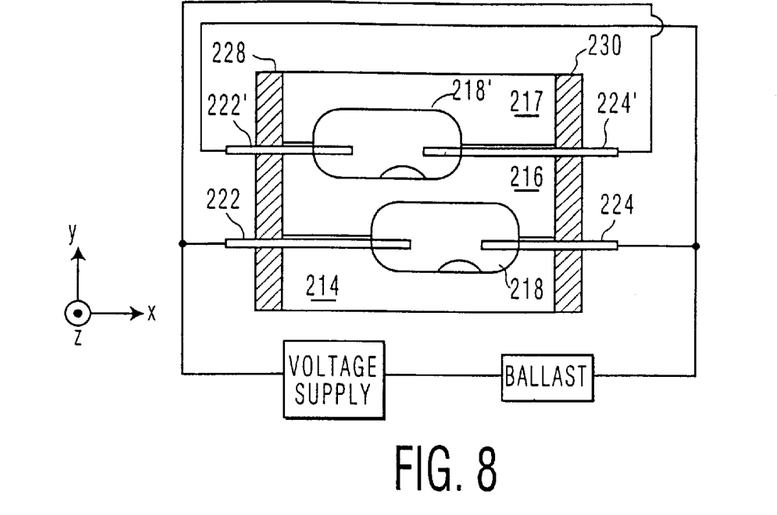
FIG. 8 is an alternative embodiment of a lamp of the present invention having a hot restrike feature.

FIG. 8 is a modification of the lamp of FIG. 7, having hot re-strike capability. In FIG. 8, the cavities 218, 218' are offset, so that an extended electrode 224' of the upper cavity 218' is adjacent the lower cavity 218. Likewise an extended electrode 222 of lower cavity 218 is adjacent the upper cavity 218'. By crossing the electrodes as shown in FIG. 7, the extended electrode 222 operates as an antenna with phase opposite electrode 222', thus enhancing ignition of cavity 218'. Similarly, extended electrode 224' operates as an antenna with phase opposite electrode 224, thus enhancing ignition of cavity 218.

Figure 7A:
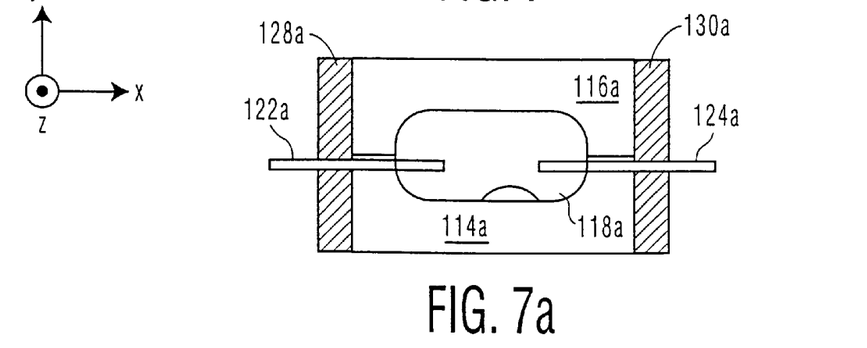
FIGS. 7a and 7b is an alternative embodiment of the lamp of FIG. 7.
Figure 7B:
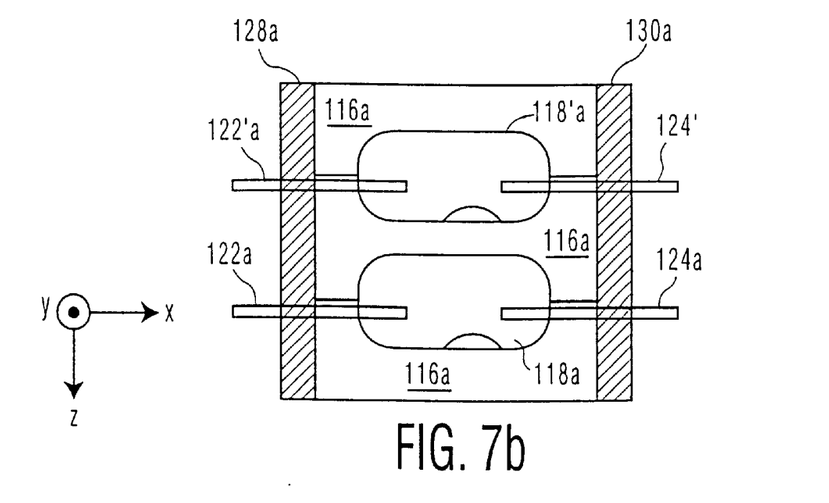
Figure 8A:
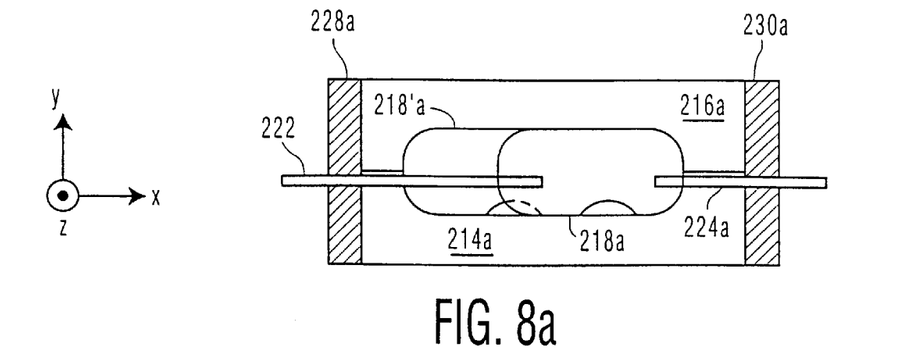
FIGS. 8a and 8b is an alternative embodiment of the lamp of FIG. 8.
Figure 8B:
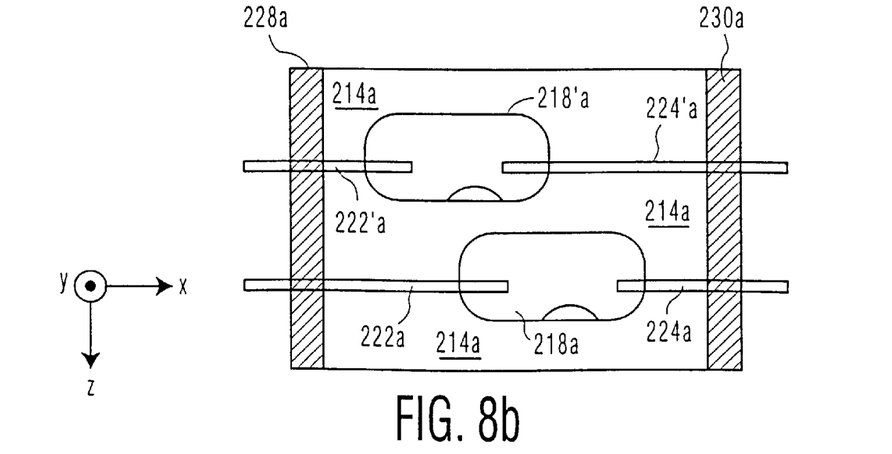

Alternative embodiments to the lamps shown in FIGS. 7 and 8 are shown in FIGS. 7a, 7b, 8a and 8b. (Analogous features in FIGS. 7a, 7b, 8a and 8b are labeled with an "a" suffix.) The hot restrike capability in these embodiments is also accomplished by two adjacent cavities. However, instead of being cavities that are stacked vertically, as in FIGS. 7 and 8, they are adjacent in the horizontal (xz) plane. (This is best seen in FIGS. 7b and 8b, which shows the lamps of FIGS. 7a and 8a looking down along the y axis, i.e., in the xz plane.) This allows the lamps to be made using only two substrate layers, as seen in FIGS. 7a and 8a.

(A thin rectangular layer of molybdenum between the cavities and the melt zones would also be visible in Figs. FIGS. 7b and 8b, but have been omitted for clarity.)

Figure 9:
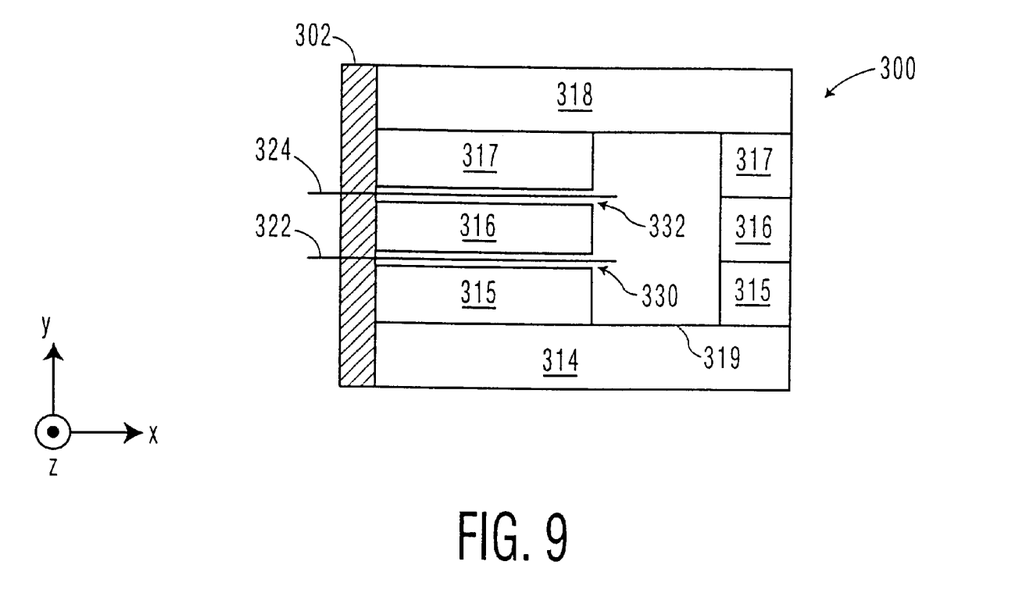
FIG. 9 is a lamp of the present invention having both electrodes positioned on one side of the lamp cavity.

A hot restrike capability is enhanced by a lamp 300 having electrodes 322, 324 at one end, as shown in FIG. 9. The lamp 300 is comprised of five substrate layers 314–318 with a cavity 319 extending through the three intermediary substrates 315–317. Channels 330, 332 are etched into substrates 315, 317 and receive electrodes 330, 332. The substrates 314–318 are bonded together, and a melt zone 302 seals the electrodes 322, 324 within the lamp.

The lamp 300 of FIG. 9 is easier to construct because cavity 319 is created by simply boring or etching through the intermediary substrates 315–317. The distance between electrodes 330, 332 (the "arc length") is precisely controlled and reproducible since it is determined by the thickness of the substrate 316 between substrates 315, 317. There are also optical advantages achieved by positioning both electrodes at one end, such as elimination of shadows from the electrodes and/or leads when the arc is imaged through a lens or reflector. Also, by eliminating the electrode at one end of the lamp, the amount of quartz at that end is reduced. Not only will this reduce the size of the lamp, a particular luminous output may be achieved using less electrical power. Thus, a lower wattage (10–20 W) microlamp may be made for applications where smaller total lumens are desired.

Moreover, this lamp 300 may have an enhanced hot restrike capability. The single ended geometry reduces the quartz around the cavity 319, which allows the mercury pressure to increase rapidly during start-up by minimizing heat losses. The geometry also provides a larger mass of quartz behind the electrode side of the cavity 319, thus providing a heat sink that will allow the mercury to condense in the shortest time possible for a hot restrike.

Typical dimensions of the cavity of the lamp 300 of FIG. 9 are 2.4×3.5×2.0 mm (x, y and z dimensions, respectively, as shown in FIG. 9). The separation of the electrodes 330, 332 (and thus the arc length) is typically 1.2 mm The single sided electrode configuration of FIG. 9 may be readily applied to the dual cavity configuration of FIGS. 7 and 8, thus mutually enhancing the hot re-strike capacities of each configuration even further.

Figure 9A:
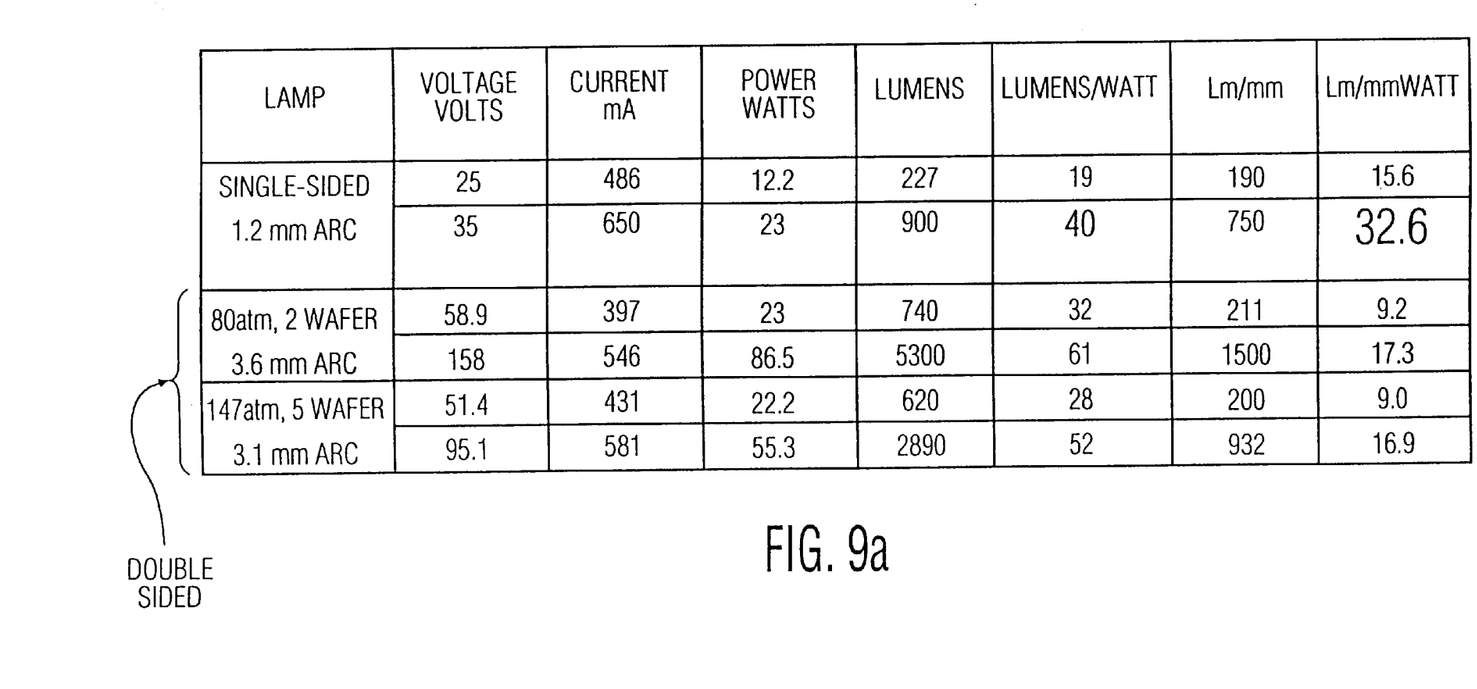
FIG. 9a is a chart giving experimental results of a microlamp of the present invention.

FIG. 9a gives experimental results comparing a single-sided microlamp having a mercury fill to two double-sided microlamps also having a mercury fill. The double-sided lamps are considered relatively good performers (for mercury fills) because of their high pressure capabilities. It is seen, however, that the lumens per watt of the single-sided lamp is comparable to, or exceeds, the double-sided lamps. When the arc length of the lamps are taken into account, a measure of "brightness efficacy," the single-sided lamp is superior (with 32.6 Lm/mm-Watt).

The above described structures and methodology are merely illustrative of the principles of the present invention. Numerous modifications and adaptations thereof will be readily apparent to those skilled in the art without departing from the spirit and scope of the present invention and the appended claims.

What is claimed is:

1. A gas discharge light emitting device comprising:
   a) three or more substrates capable of withstanding heat and pressure;
   b) said substrates arranged in a stack, each substrate contacting an adjacent substrate in the stack via confronting planar surfaces;
   c) a first enclosed cavity defined by separate cavities in at least one substrate in the stack;
   d) a second enclosed cavity defined by separate cavities in at least one substrate in the stack;
   e) a bonded interface disposed substantially across said substrates at their confronting surfaces, except at the cavity;
   f) luminescent gas discharge material disposed in the first enclosed cavity;
   g) means for energizing the luminescent material in the first enclosed cavity;
   h) ultraviolet light discharge material disposed in the second enclosed cavity; and
   i) means for energizing the ultraviolet light discharge material in the second enclosed cavity.

2. The gas discharge lamp as claimed in claim 1, wherein the means for energizing the luminescent material in the first enclosed cavity is two electrodes that extend into the first enclosed cavity.

3. The lamp as claimed in claim 1, wherein the means for energizing the ultraviolet light discharge material in the second enclosed cavity comprises at least one of the two electrodes that extend into the first enclosed cavity and a third electrode adjacent the second enclosed cavity.

4. The lamp as claimed in claim 1, wherein the stack is comprised of a first, second, and third substrate, the first enclosed cavity is defined by partial cavities disposed in the first and second substrates and the second enclosed cavity is defined by a cavity disposed in the third substrate and a planar surface of the second substrate.

5. The lamp as claimed in claim 1, wherein the stack is comprised of a first, second, third, and fourth substrate, the first enclosed cavity is defined by partial cavities disposed in the first and second substrates and the second enclosed cavity is defined by a cavity disposed in a fourth substrate and a planar surface of the third substrate, the third substrate interposed between the second and fourth substrates.

6. The lamp as claimed in claim 5, wherein the means for energizing the ultraviolet light discharge material in the second enclosed cavity comprises an electrode disposed in the second substrate adjacent the planar surface of the third substrate.

7. The lamp as claimed in claim 1, wherein the means for energizing the ultraviolet light discharge material in the second enclosed cavity comprises an electrode disposed at least in part within the second enclosed cavity.

8. A gas discharge light emitting device comprising:
   a) first, second, third, fourth, and fifth substrates capable of withstanding heat and pressure;
   b) said substrates arranged in a stack, each substrate contacting an adjacent substrate in the stack via confronting planar surfaces;
   c) an enclosed cavity defined by openings in the second, third, and fourth substrates in the stack;
   d) a bonded interface disposed substantially across said substrates at their confronting surfaces, except at the cavity;
   e) luminescent gas discharge material disposed in the enclosed cavity; and
   f) at least two electrodes extending into the enclosed cavity for energizing the luminescent material, the electrodes extending into the cavity from a single side of the lamp.

* * * * *